United States Patent
Angelo et al.

(10) Patent No.: US 11,210,404 B2
(45) Date of Patent: Dec. 28, 2021

(54) BLOCKCHAIN-BASED STATE VERIFICATIONS OF SOFTWARE COMPONENT VULNERABILITY DATABASE FOR SOFTWARE PRODUCTS

(71) Applicant: NETIQ CORPORATION, Sanford, NC (US)

(72) Inventors: Michael F. Angelo, Houston, TX (US); Lloyd L. Burch, Provo, UT (US); Baha Masoud, Orem, UT (US)

(73) Assignee: NETIQ CORPORATION, Houston, TX (US)

( * ) Notice: Subject to any disclaimer, the term of this patent is extended or adjusted under 35 U.S.C. 154(b) by 283 days.

(21) Appl. No.: 16/441,310

(22) Filed: Jun. 14, 2019

(65) Prior Publication Data
US 2020/0394308 A1    Dec. 17, 2020

(51) Int. Cl.
| H04L 29/06 | (2006.01) |
| G06F 21/57 | (2013.01) |
| G06F 16/182 | (2019.01) |
| H04L 9/32 | (2006.01) |
| H04L 9/06 | (2006.01) |

(52) U.S. Cl.
CPC ........ *G06F 21/577* (2013.01); *G06F 16/1824* (2019.01); *H04L 9/0643* (2013.01); *H04L 9/3247* (2013.01); *H04L 2209/38* (2013.01)

(58) Field of Classification Search
CPC . G06F 21/577; G06F 16/1824; H04L 9/0643; H04L 2209/38
See application file for complete search history.

(56) References Cited

U.S. PATENT DOCUMENTS

| 7,451,488 B2 | 11/2008 | Cooper et al. |
| 8,650,097 B2 | 2/2014 | Choi |
| 9,871,815 B2 | 1/2018 | Ouchn |
| 9,990,501 B2 | 6/2018 | McGee et al. |
| 10,108,803 B2 | 10/2018 | Chari et al. |
| 10,114,980 B2 | 10/2018 | Barinov et al. |
| 2018/0096042 A1* | 4/2018 | Kuzma ................ H04L 9/3297 |
| 2018/0255090 A1 | 9/2018 | Kozloski et al. |
| 2019/0305957 A1* | 10/2019 | Reddy .................. H04L 63/123 |
| 2020/0067965 A1* | 2/2020 | Dada ...................... H04L 63/20 |

(Continued)

FOREIGN PATENT DOCUMENTS

| CN | 108848115 | 11/2018 |
| WO | WO-2018031703 A1 | 2/2018 |
| WO | WO-2020211258 A1 * | 10/2020 |

OTHER PUBLICATIONS

Lee, Boohyung, and Jong-Hyouk Lee. "Blockchain-based secure firmware update for embedded devices in an Internet of Things environment." The Journal of Supercomputing 73.3 (2017): 1152-1167.: (Year: 2017).*

(Continued)

*Primary Examiner* — Shawnchoy Rahman

(57) ABSTRACT

A technique includes determining, by a computer, entries of a software vulnerability database that is associated with a plurality of components associated with a release of a software product. The technique includes determining, by the computer, a block of a blockchain representing a vulnerability state of the plurality of components; and associating, by the computer, the block of the blockchain with the product release.

20 Claims, 8 Drawing Sheets

(56) References Cited

U.S. PATENT DOCUMENTS

2020/0242254 A1\* 7/2020 Velur .................... G06F 21/562
2020/0252219 A1\* 8/2020 Singi ...................... G06F 21/64
2020/0358802 A1\* 11/2020 Viswambharan ..... G06F 9/5072

OTHER PUBLICATIONS

Lemieuz, V.; "Blockchain and Distributed Ledgers as Trusted Recordkeeping Systems: An Archival Theoretic Evaluation Framework"; Future Technologies Conference (FTC); uploaded Jun. 9, 2017; 12 pp.

Github; "Utilizing a Blockchain Ledger to Establish Trust in the Open Source Software Used Across a Supply Chain"; https://github.com/SamAhm/sparts-1; uploaded on Nov. 16, 2018; 5 pp.

Genge, B.; Security and Communications Networks; "Special Issue Paper; "ShoVAT: Shodan-Based Vulnerability Assessment Tool for Internet-Facing Services; published online May 11, 2015; pp. 2696-2714 19 pp.

Sanguino, Luis; "Software Vulnerability Analysis Using CPE and CVE"; Fraunhofer FKIE, Bonn, Germany; May 16, 2017; 29 pp.

GFI Languard; "Track Latest Vulnerabilities and Missing Updates"; www.gfi.com/products-and-solutions/network-security-solutions/gfi-languard/specifications/track-latest-vulnerabilities-and-missing-updates: Nov. 22, 2018; 2 pp.

"What Does Timestamp Match Mean"; web page at https://community.synopsys.com/s/article/What-does-timestamp-match-mean; downloaded on May 31, 2019; 2 pp.

U.S. Appl. No. 16/441,330, filed Jun. 14, 2019; 32 pp.

\* cited by examiner

BLOCKCHAIN-BASED STATE VERIFICATIONS OF SOFTWARE COMPONENT VULNERABILITY DATABASE FOR SOFTWARE PRODUCTS

BACKGROUND

When a software product is released, the code of the product may be scanned in an enumeration process to determine an inventory of items that are contained in the product, including third party components. As an extension to the enumeration process, a software component vulnerability and exposures database, such as the Common Vulnerabilities and Exposures (CVE) database maintained by the MITRE Corporation, may be scanned for potential vulnerabilities that have been linked to the third-party components of the product.

The CVE database contains entries for publicly known vulnerabilities. An entry of the CVE database may contain such information as identification (ID) number, a description (e.g., a description that identifies the name and vendor of the affected product, the versions of the product that are affect, the vulnerability type, the impact, how access is made to product to exploit vulnerability, program code and inputs involved, and so forth), and a reference to a publicly available source for information on the vulnerability. When the search of the database reveals that a particular third-party component has a vulnerability risk, then the third-party component may be inspected and mitigated, as appropriate, to address the vulnerability. When there are no un-triaged or un-mitigated vulnerability risks for the product, then the product is allowed to be released.

DETAILED DESCRIPTION

Figure 1:
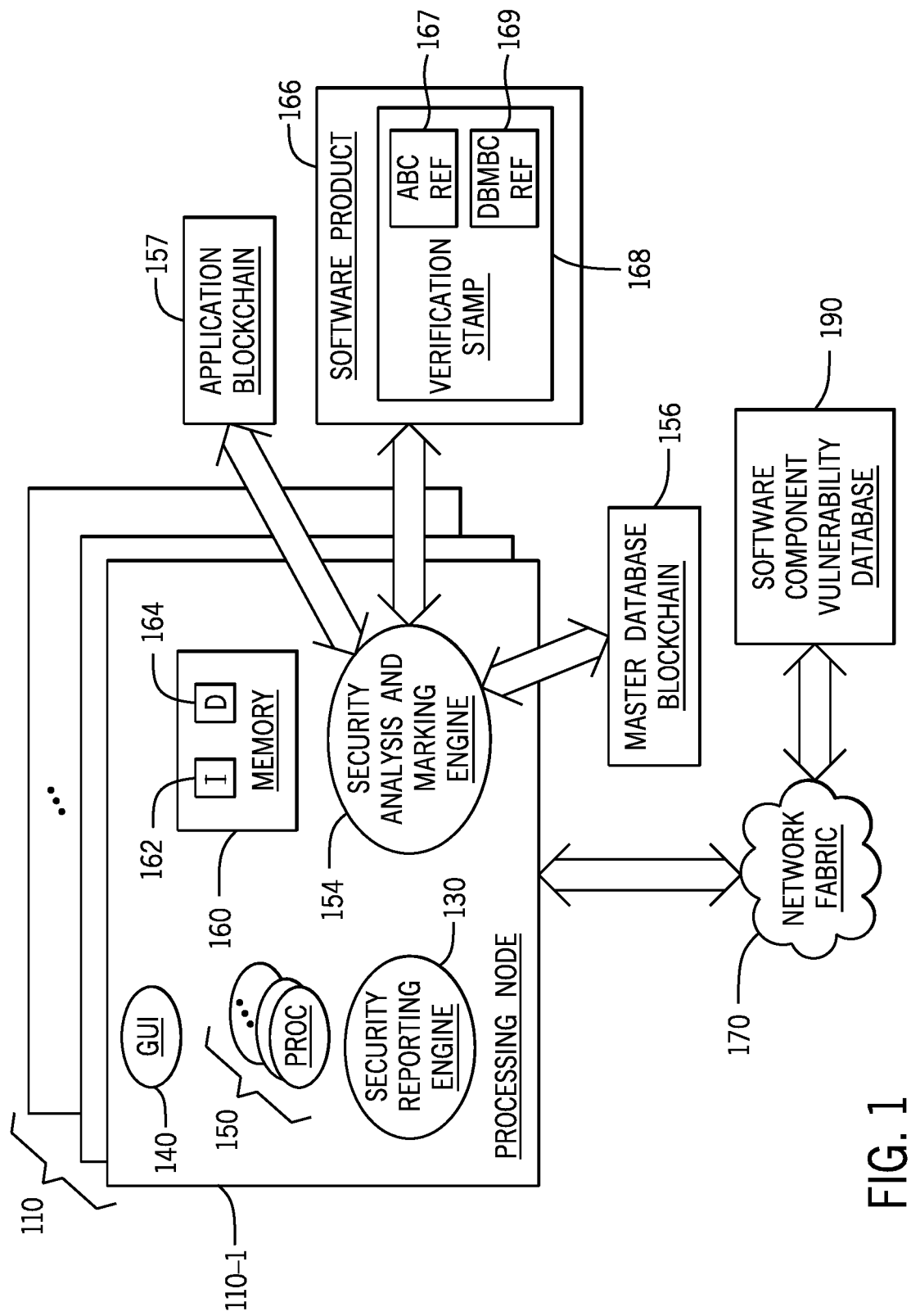
FIG. 1 is a schematic diagram of a computer system having a security analysis and marking engine and a security reporting engine according to an example implementation.

A provider of a software product release may publish a list of third-party components that are contained in the release. Consumers of the software product may assume that the software provider checked all potential vulnerability risks of the third-party components against a software component vulnerability and exposures database (also called a "software component vulnerability database" herein), such as the CVE database; and the consumers may assume that the provider addressed and mitigated the risks as appropriate. Consequently, the consumers may effectively ignore vulnerability risks of the third-party components. This may not be the best practice, however, as after the product release, entries for the third-party components may be added to the software component vulnerability database to account for newly discovered vulnerability risks, and entries may be supplemented with new information about entries for the third-party components. Moreover, some entries in the software component vulnerability database may be mere placeholders to reserve IDs for future database entries. Accordingly, a placeholder entry may have been created in the software component vulnerability database at the time of the product release; and after the product release, the entry may be updated with a description that identifies one of the third-party components as having a vulnerability risk. Even though the reserve entry existed at the time of the product release, the provider did not address the vulnerability risk.

As can be appreciated, due to the everchanging nature of the software component vulnerability database, it becomes challenging for the provider of the software product to know and prove which particular vulnerabilities were described in the database at the time of the scan of the database. In other words, it may be challenging for the provider to and prove the state of the software component vulnerability database at the time of the software product release.

In accordance with example implementations that are described herein, a provider of a software product may publish a verification stamp for the software product. More specifically, in accordance with example implementations, a particular release, or version, of a software product may be associated with a published verification stamp that contains references to the following blockchains: a reference to a block number, or page, of a blockchain that is associated with a component inventory of the software product; and a reference to a block number, or page, of a blockchain that is associated with state of a software component vulnerability database. With this information, the provider of the software product can prove which particular vulnerabilities were described in the software component vulnerability database at the time of the provider's scan of the database; and consumers of the software product, with this information, are made aware of the vulnerability risks that were and were not addressed by the software product provider.

In the context of this application, a "blockchain" refers to a cryptographic ledger of transactions. In general, as its names implies, a blockchain refers to a linked set of blocks. Each block represents one or multiple transactions, and each block, except for the initial genesis block, is linked to a prior block of the blockchain. More specifically, the blocks are arranged in a sequence (beginning with the genesis block), and with the exception of the genesis block, each block contains a cryptographic hash of the prior block. The cryptographic linking of the blocks preserves the integrity of the recorded transactions, as even a small change to one of the blocks in a tampering effort changes the hash value of the block and exposes the tampering effort.

For the application blockchain, each block may be associated with a different version, or release, of the software product. The transactions of the block represent changes to the composition of the product (e.g., new components, removed components, and modified components).

The blockchain that is associated with the state of the software component vulnerability database is referred to as the "master database blockchain" herein. In accordance with example implementations, a block of the master database blockchain is associated with a set of one or multiple transactions that change the software component database. As examples, a given block of the master database blockchain may contain one or multiple of the following transactions: a transaction to add an entry to the software component vulnerability database; a transaction to delete, or remove, an entry from the software component vulnerability database; a transaction to modify an entry to the software component vulnerability database; or a transaction to reserve an entry in the software component vulnerability database (i.e., an entry ID was created as a placeholder for a future complete entry containing a description, a reference to a publicly available source, and so forth). In accordance with example implementations, a given block of the master database blockchain may represent a transaction to publish a copy of the software vulnerability database.

In accordance with example implementations, each block of the master database blockchain contains multiple blockchains, which correspond to the entries of the software component vulnerability database. More specifically, in accordance with example implementations, each block of the master database blockchain contains a blockchain (called an "SCVE blockchain" herein) for each entry of the software component vulnerability database. For a given SCVE blockchain, each block of the SCVE blockchain represents one or multiple transactions for the corresponding entry of the software component vulnerability database. Therefore, for given block of the master database blockchain, the last block of each SCVE blockchain represents the current state of a corresponding entry of the software component vulnerability database.

The software component vulnerability database may be modified (i.e., to add, delete, modify or reserve entries) by authorized parties called "security reporters." For example, the security reporters may be affiliated with different software providers. In accordance with example implementations, a database authority (a single central authority, such as the MITRE Corporation, for example) may be responsible for issuing credentials to the security reporters. In accordance with example implementations, when a change is to be made to an entry of the software component vulnerability database by a security reporter, the security reporter accesses the most recent block of the master database blockchain and more specifically, accesses the most recent block of the SCVE blockchain (of the most recent master database blockchain) that corresponds to the entry and generates the next block of the SCVE blockchain representing the change.

If the entry is a new or reserved entry that is being created, then then security reporter generates the initial, or genesis, block for a new SCVE blockchain for the entry. If the security reporter is changing an existing entry, then the block of the SCVE blockchain describes the chain. The SCVE blockchain is digitally signed by the security reporter and communicated to the database authority. After the database authority validates the new SCVE blockchain, the database authority incorporates the new SCVE blockchain into a new block for the master database blockchain (which may also include one or multiple other SCVE blockchains), digitally signs the new block and publishes the new block for the master database blockchain.

As a more specific example, FIG. 1 depicts a computer system 100 in accordance with example implementations. In general, the computer system 100 may be associated with a software provider that is releasing a software product 166. The computer system 100 includes one or multiple processing nodes 110, and as illustrated in FIG. 1, a given processing node 110 may include a security analysis and marking engine 154. The security analysis and marking engine 154 may receive input (keystroke data, mouse or other input device-aided selections, and so forth) and provide output (displayed images depicting charts, lists, graphs, and so forth) through a graphical user interface (GUI) 140. As an example, the GUI 140 may contain graphical controls that allow a user to select a software product, initiate an enumeration scan of the software product, initiate a software component vulnerability scan for third party components found in the software component vulnerability scan, access a master database blockchain, access SCVE blockchains, generate SCVE blocks, and so forth, as described herein. It is noted that although the GUI 140 and security analysis and marking engine 154 are depicted in FIG. 1 as being single components, in accordance with example implementations, the security analysis and marking engine 154 may be formed from separate components, which may have associated GUIs.

In accordance with example implementations, the security analysis and marking engine 154 is constructed to perform an enumeration scan of the software product 166 for purposes of determining an inventory of all information that is present in the software product 166, including third-party components. For these third-party components, the security analysis and marking engine 154 is further constructed to scan a software component vulnerability database 190 for purposes of identifying any vulnerabilities associated with these third-party components. As an example, this scan may, for example, retrieving data representing all of the entries of the software component vulnerability database 190; searching the data for software component keywords; and identifying entries that corresponds to the third-party components that were identified in the enumeration scan. Based on the results of the database scan, remediation measures may be undertaken by the software provider for purposes of addressing any previously unaddressed vulnerability risks that are found via the database scan.

As described further herein, an authority associated with the software component vulnerability database 190 publishes a master database blockchain 156, which is a cryptographic ledger representing all changes that are made to the database 190. In accordance with example implementations, for a particular release, or version, of the software product 166, the security analysis and marking engine 154 creates a validation stamp 166 for the product release. In accordance with example implementations, the validation stamp 166 contains a reference 167 to a block number, or page, of an application blockchain 157, which corresponds to the product release; and the validation stamp 166 contains a reference 169 to a block number, page, of the master database blockchain 156, which corresponds to the product release. The application blockchain 157 may be published by the software provider, and the master database blockchain 156 may be published by the authority for the software component vulnerability database 190. The application blockchain reference 167 allows consumers of the software product 166 to know the third-party component inventory of the software product 166. The master database blockchain reference 169 allows the software provider to prove the state of the software component vulnerability database 190 when scanned by the provider; and the master database blockchain reference 169 allows consumers of the software product 166 to determine which third component vulnerabilities have been addressed in the release.

In accordance with example implementations, the processing node 110 may include one or multiple physical hardware processors 150, such as one or multiple central processing units (CPUs), one or multiple CPU cores, and so forth. Moreover, the processing node 110 may include a local memory 160. In general, the local memory 160 is a non-transitory memory that may be formed from, as examples, semiconductor storage devices, phase change storage devices, magnetic storage devices, memristor-based devices, a combination of storage devices associated with multiple storage technologies, and so forth.

Regardless of its particular form, the memory 160 may store various data 164 (data representing software component identifiers, third party component identifiers, vulnerability entries (descriptions, IDs, public source links, and so forth), master database blockchain data, software component vulnerability entry block chain data, product identification information, hashes, blockchain block numbers, and so forth). The memory 160 may store machine executable instructions 162 (i.e., software) that, when executed by the processor(s) 150, cause the processor(s) 150 to form one or multiple components of the processing node 110, such as, for example, the security analysis and marking engine 154, the GUI 140, and so forth.

In accordance with some implementations, each processing node 110 may include one or multiple personal computers, workstations, servers, rack-mounted computers, special purpose computers, and so forth. Depending on the particular implementations, the processing nodes 110 may be located at the same geographical location or may be located at multiple geographical locations. Moreover, in accordance with some implementations, multiple processing nodes 110 may be rack-mounted computers, such that sets of the processing nodes 110 may be installed in the same rack. In accordance with further example implementations, the processing nodes 110 may be associated with one or multiple virtual machines that are hosted by one or multiple physical machines.

In accordance with some implementations, the processor 150 may be a hardware circuit that does not execute machine executable instructions. For example, in accordance with some implementations, the security analysis and marking engine 154 may be formed in whole or in part by an application specific integrated circuit (ASIC), a field programmable gate array (FPGA), and so forth. Thus, many implementations are contemplated, which are within the scope of the appended claims.

As also depicted in FIG. 1, the processing node 110 may communicate with the software component vulnerability database 190 over network fabric 170. Moreover, the processing node 110 may communicate over the network fabric 170 to receive data representing the master database blockchain. In general, the network fabric 170 may include components and use protocols that are associated with any type of communication network and/or multiple types of communication networks, such as (as examples) Fibre Channel networks, iSCSI networks, ATA over Ethernet (AoE) networks, HyperSCSI networks, local area networks (LANs), wide area networks (WANs), wireless networks, global networks (e.g., the Internet), or any combination thereof.

Figure 2:
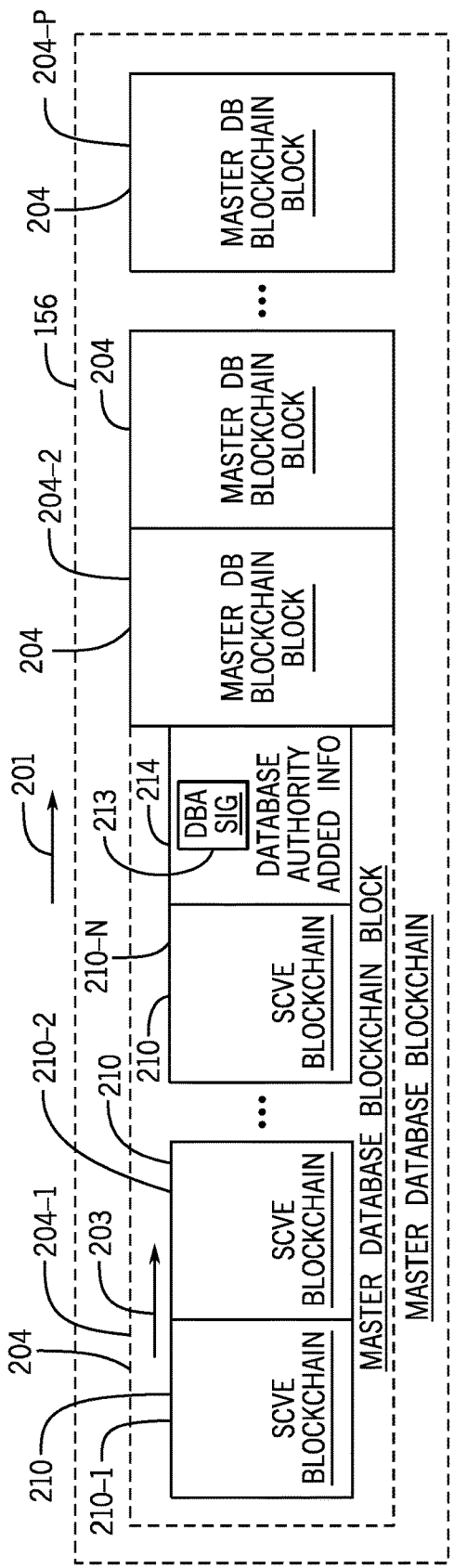
FIG. 2 is an illustration of a master database blockchain according to an example implementation.

FIG. 2 depicts the master blockchain 156, in accordance with example implementations. For this example, the master database blockchain 156 includes P blocks 204, including a genesis block 204-1 (representing an initial state of the software component vulnerability database 190) and additional blocks 204 that have been added (in direction 201) to represent changes to the database 190. A block 204 of the master database blockchain 156 represents a particular state of the software component vulnerability database 190 at a particular time that is associated with the block 204. A particular block 204 may represent a set of one or multiple changes to the software component vulnerability database 190 (relative to the immediate previous block 204), and a particular block 204 may represent the copying of the database 190 at a particular time. For the state of the master blockchain 156 depicted in FIG. 2, block 204-P represents the current state of the software component vulnerability database 190.

In accordance with example implementations, each block 204 of the master database blockchain 156 contains multiple SCVE blockchains 210: one SCVE blockchain 210 for each entry of the software component vulnerability database 190 (FIG. 1) existing at the time associated with the block 204. For the illustration of FIG. 2, the genesis block 210-1 has N SCVE blockchains 201 corresponding to the N entries of the software component vulnerability database 190. The number of SCVE blockchains 210 may vary among the blocks 204, as the number of entries of the software component vulnerability database 190 may vary, as new entries may be added and deleted over time.

The SCVE blockchain 210 is a cryptographic ledger that represents transactions that have been made to a corresponding entry of the software component vulnerability database 190. In accordance with some implementations, each block of an SCVE blockchain 210 may represent a transaction that is made by a security reporter to the entry, and the transaction is associated with a particular time.

Referring to FIG. 2 in conjunction with FIG. 1, an SCVE blockchain 210 may be created due to the addition of an entry to the software component vulnerability database 190 by a security reporter, and new blocks may be added to an existing SCVE blockchain 210 by security reporters to reflect changes to a corresponding existing entry of the database 190. FIG. 1 illustrates a security reporting engine 130, which may be used (via the GUI 140 or another GUI) by a security reporter to extend a particular SCVE blockchain 210 when an entry (an actual entry or a reserved entry) of the software component vulnerability database 190 is to be modified or created. It is noted that although FIG. 1 depicts the security reporting engine 130 as being part of the processing node 110-1, the security reporting engine 130 may be located on another processing node 110. Moreover, the security reporting engine 130 may be used by a security reporter other than a security report that is affiliated with a software provider or affiliated with a security analysis and marking engine 154, in accordance with further example implementations.

To change or add an entry to the software component vulnerability database 190, a security reporter may use the security reporting engine 130 to create a transaction that adds or changes an entry to the database 190. Through the security reporting engine 190, the security reporter may retrieve the current published master blockchain 156, retrieve the corresponding SCVE blockchain 210 (that corresponds to the entry being modified or created) and create an additional block for the SCVE blockchain 210 to extend the blockchain based on the created transaction.

Figure 4:
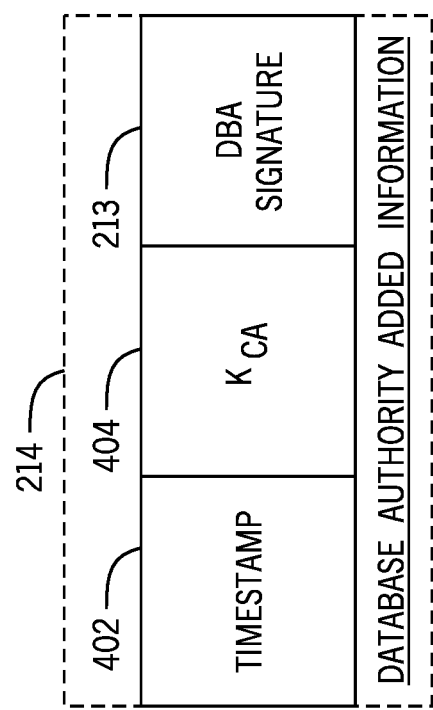
FIG. 4 is an illustration of information added to a block of the master database blockchain by a central authority according to an example implementation.

In accordance with example implementations, the security reporter has a private key (part of a private key and public key pairing), which the security reporter may use (via the security reporting engine 130) to digitally sign the new block and communicate the signed block to the management authority for the software component vulnerability database 190. Using the public key of the pair, the management authority may then validate the new block and correspondingly make the decision whether the new SCVE block is valid. The management authority may receive other such new SCVE blocks, such that, at a certain interval, the management authority may update the software component vulnerability database 190 with a set of entry changes and correspondingly publish a new block 204 of the master database blockchain 156. As depicted at reference number 214, in FIG. 2, the database authority may add information to the block 204. In particular, the blocks 204 may be digitally signed by the management authority using a private key (part of a private key and public key pair), as depicted at reference numeral 213. The public key of the pair may be used to validate the blocks 204. Referring also to FIG. 4, the information 214 that is added by the management authority may further include a timestamp 402 and the public key 404 of the management authority.

Figure 3:
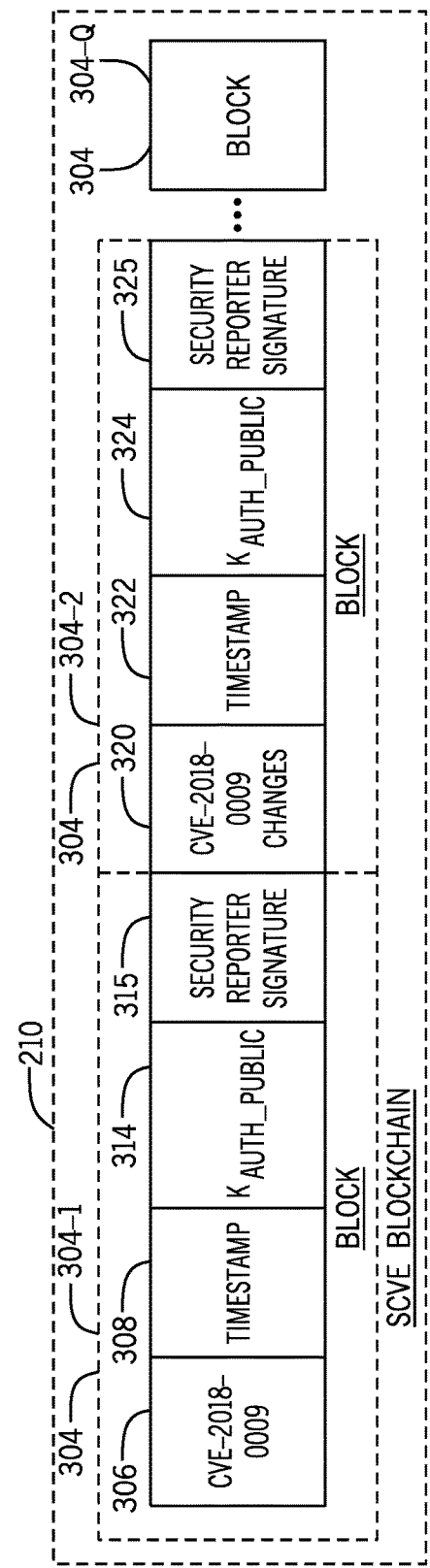
FIG. 3 is an illustration of a security component vulnerability entry (SCVE) blockchain according to an example implementation.

FIG. 3 illustrates the SCVE blockchain 210 in accordance with example implementations. As noted above, the SCVE blockchain 210 is a ledger representing changes to a particular entry of the software component vulnerability database 190 over time. Each set of changes is represented by a block 304, with block 304-1 being the genesis block (representing the entry as created), and block 304-Q for this example being the latest block 304. For the example that is depicted in FIG. 3, the SCVE blockchain 210 corresponds to the entry ID of "CVE-2018-0009," and the genesis block 304-1 contains a record 306 that describing the entry as originally created. A timestamp 308 of the block 304-1 contains data representing the time that the block 304-1 was created, and the block 304-1 contains a public key 314 of the security reporter who digitally signed the block 304-1 (as represented at 315) with a private key (paired with the public key 314).

FIG. 3 further depicts a block 304-2 describing a change to the CVE-2018-0009 entry. The block 304-2 contains a record 320 describing a change to the entry, along with a timestamp 322, a public key 324 of the security reporter making the change and a digital signature 325 by the security reporter.

As mentioned above, the master blockchain 156 may be extended based on changes to the database as well as copies being made of the database. In this manner, FIG. 4 depicts a master block 204 containing a timestamp 402, a public key 404 of the management authority for the database and a corresponding signature 408 of the authority representing extension of the master block 156. In a similar manner, the authority for the database may extend the master blockchain each time another transaction is created detailing a particular set of one or multiple changes to the database.

In accordance with some implementations, the management authority for the software component vulnerability database 190 may be a single, central entity, such as the MITRE Corporation. However, in accordance with further example implementations, the authority for the database may be a distributed authority that is formed from multiple entities. For example, in accordance with some implementations, authorized security reporters may have dual roles for verifying extensions to SCVE blockchains and corresponding extensions to the master blockchain. In accordance with some implementations, a consensus of database management authority entities may be required before a SCVE and/or master blockchain extension is allowed.

Figure 5:
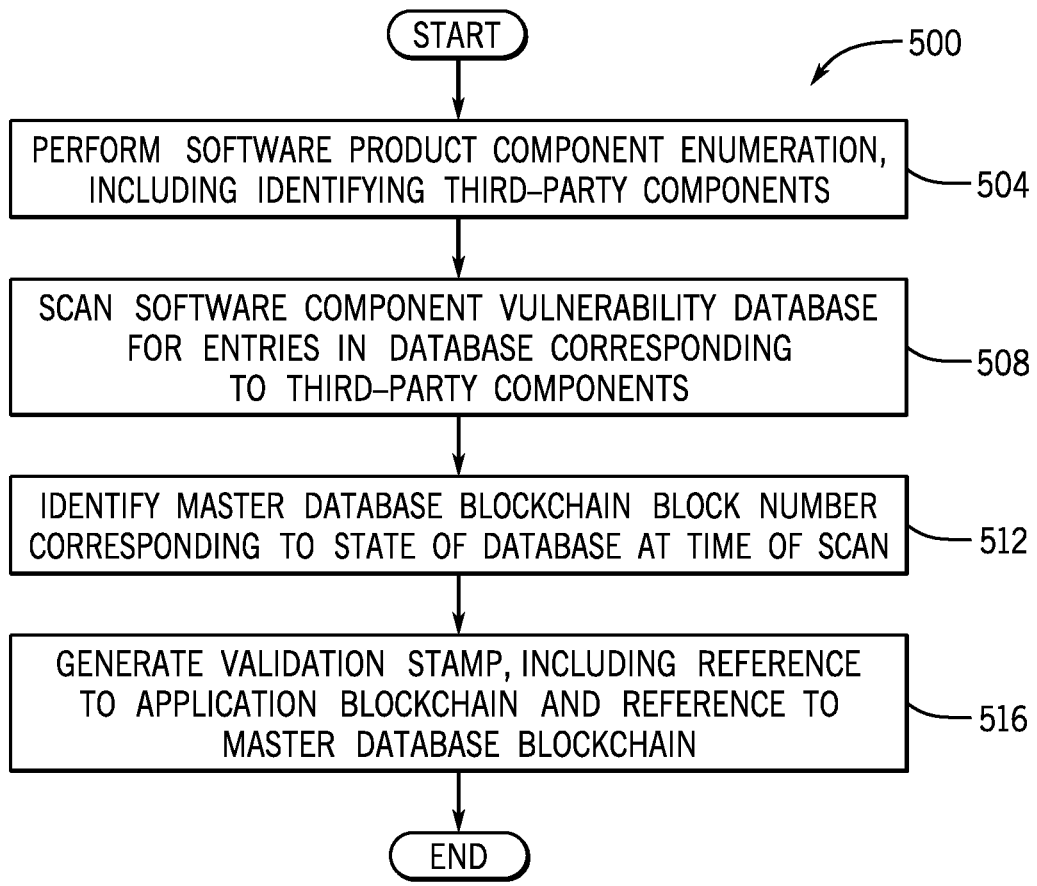
FIG. 5 is a flow diagram depicting a technique to generate a validation stamp for a software product according to an example implementation.
Figure 6:
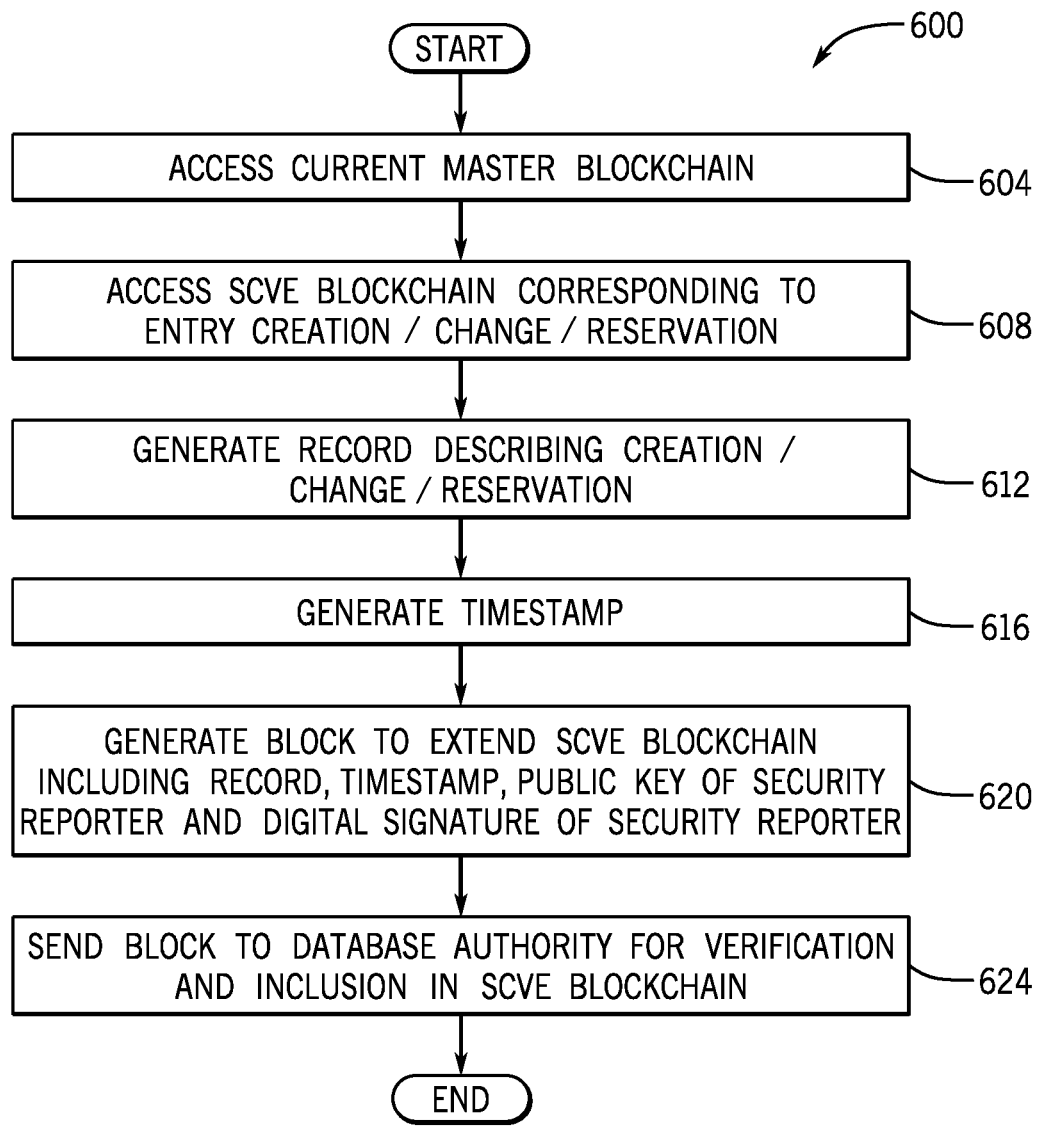
FIG. 6 is a flow diagram depicting a technique to extend an SCVE blockchain according to an example implementation.

Referring to FIG. 5 in conjunction with FIG. 1, in accordance with example implementations, the security analysis and the marking engine 154 may perform a technique 500 that includes performing (block 504) product component enumeration and scanning (block 508) a component vulnerability database for entries in the database corresponding to components that are identified in the product component enumeration. The technique 500 includes the engine 154 identifying (block 512) a master blockchain block number engine rating (block 516) a validation stamp for the software product release. As an example, the validation stamp may include one or multiple product identifiers (a product name, a product location, a description of the product, a hash of the contents of the product, and so forth) and a component vulnerability state (a master blockchain block number, identifiers for components in the master blockchain and identifiers for the software product, as examples).

In accordance with some implementations, a technique 600 may be used for purposes of extending the master blockchain. Pursuant to the technique 600, the current master blockchain may be accessed, pursuant to block 604 and SCVE blockchain that corresponds to an entry being created, changed or reserved may be accessed, pursuant to block 608. A record may then be generated (block 612) describing the creation, change or reservation of the entry and a corresponding timestamp may be generated, pursuant to block 612. A block may then be generated (block 620) to extend the SCVE blockchain including a record describing the transaction, the timestamp, the public key of the security reporter and the digital signature of the security reporter. The block may then be sent (block 624) to a database authority for verification and inclusion in the SCVE blockchain and master blockchain.

Figure 7:
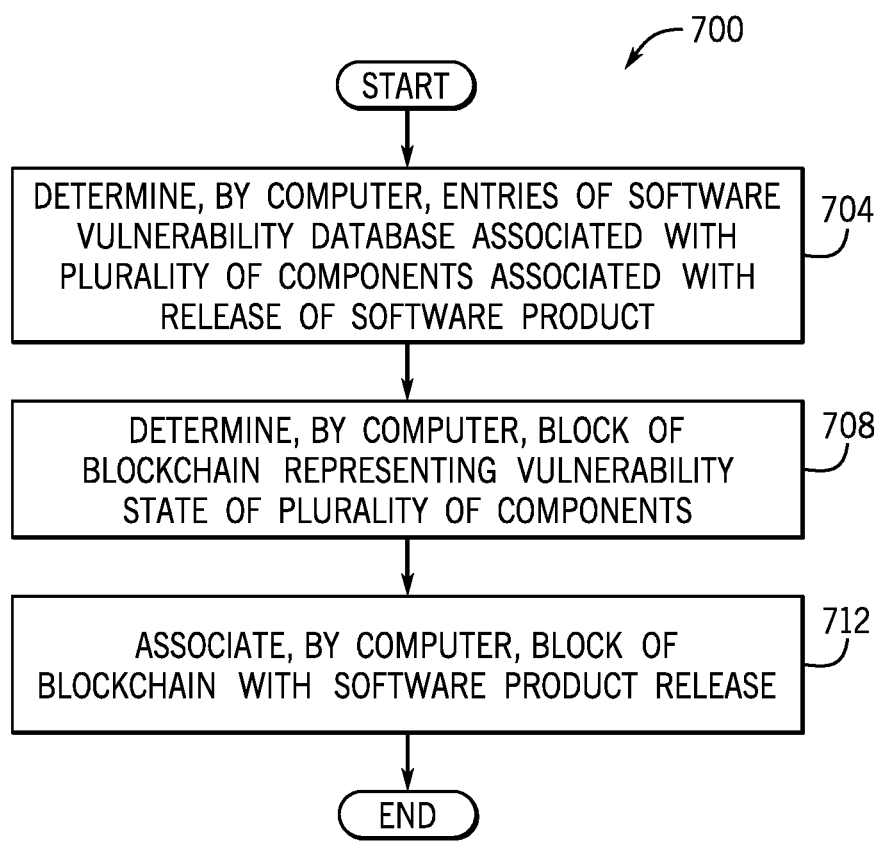
FIG. 7 is a flow diagram depicting a technique to associate a block of a blockchain representing a vulnerability state of components associated with a release of a software product according to an example implementation.

Thus, referring to FIG. 7, in accordance with example implementations, a technique 700 includes determining (block 704), by a computer, entries of a software vulnerability database associated with a plurality of components associated with a release of a software product. The technique includes determining (block 708), by the computer, a block of a blockchain representing a vulnerability state of the plurality of components and associating (block 712), by the computer, the block of the blockchain with the product release.

Figure 8:
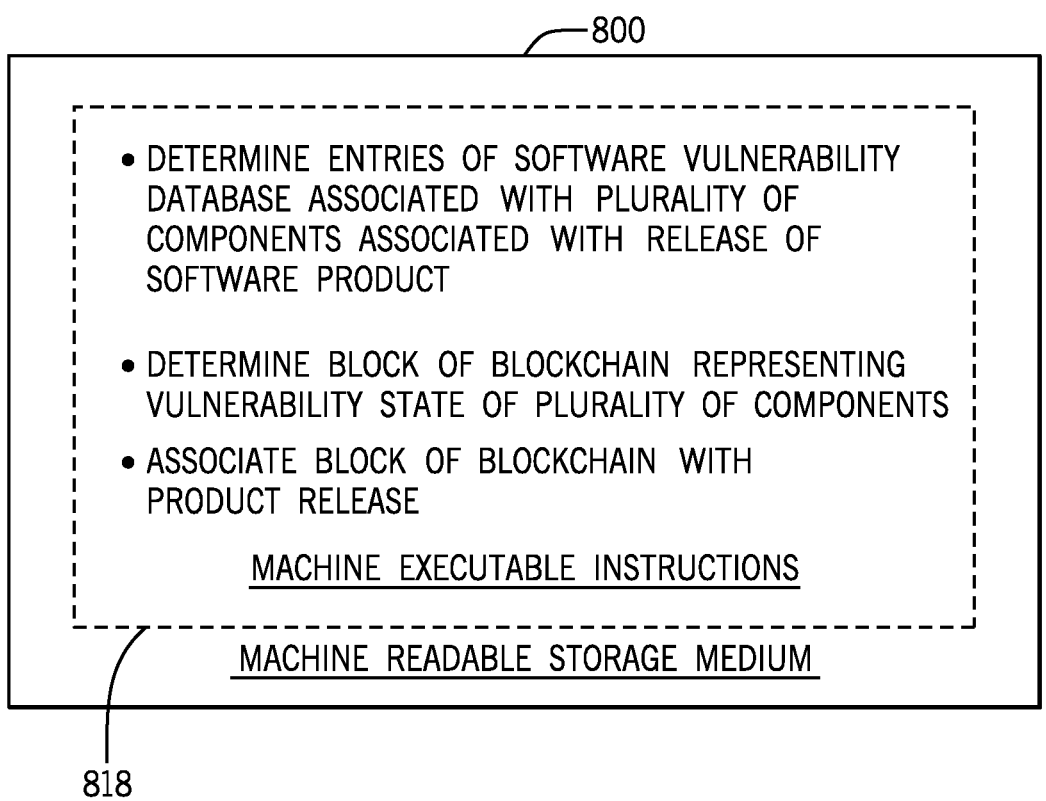
FIG. 8 is an illustration of machine executable instructions stored on a machine readable storage medium to cause a machine to associate a block of a blockchain with a release of a software product according to an example implementation.

Referring to FIG. 8, in accordance with example implementations, a non-transitory machine readable storage medium 800 stores instructions 818 that, when executed by a machine, cause the machine to determine entries of a software vulnerability database associated with a plurality of components associated with a release of a software product and determine a block of a blockchain representing a vulnerability state of the plurality of components. The instructions 818, when executed by the machine, further cause the machine to associate the block of the blockchain with the product release.

Figure 9:
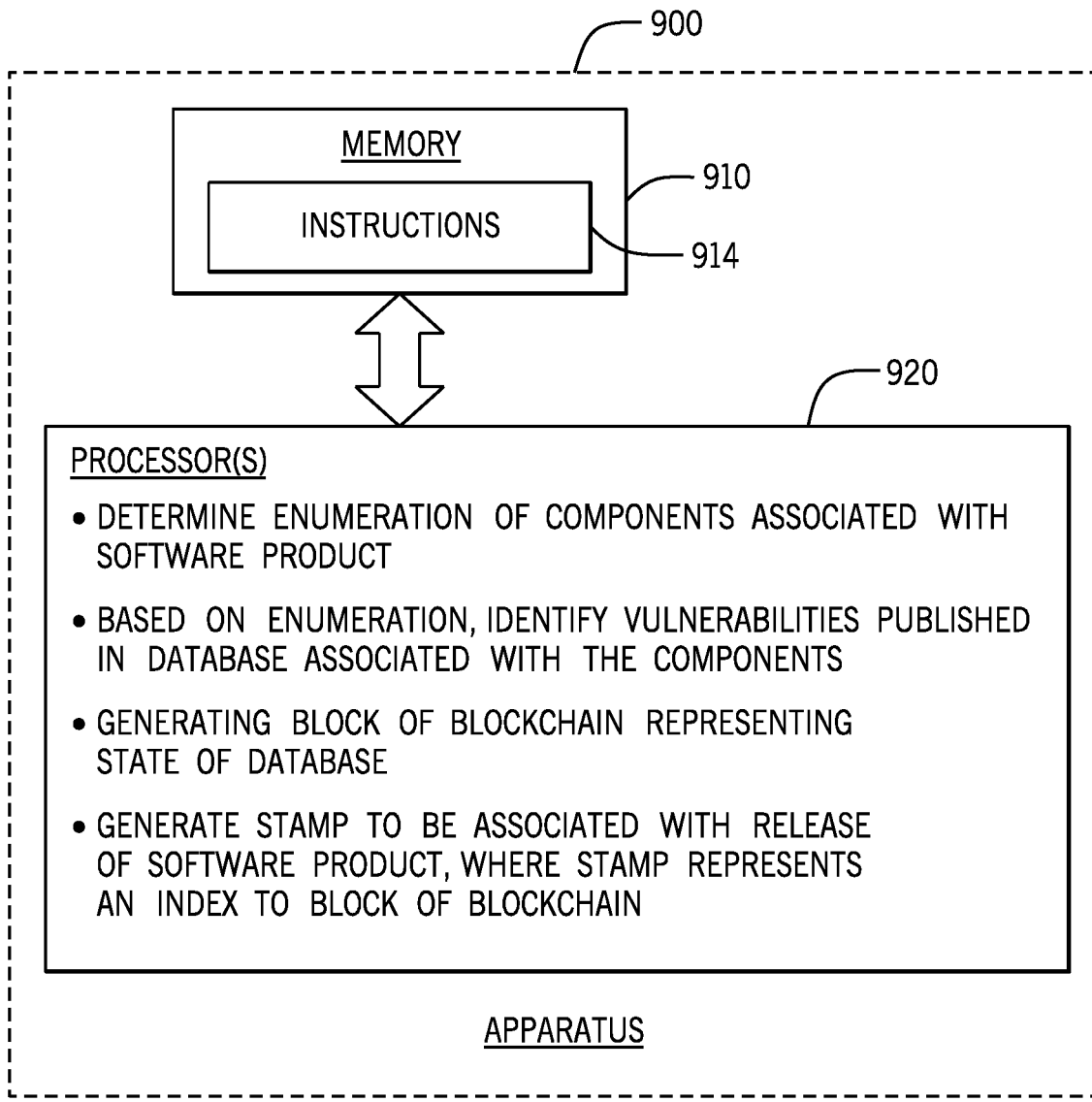
FIG. 9 is an illustration of an apparatus to generate a stamp to be associated with a release of a software product, where the stamp represents an index to a block of a blockchain representing a state of a database that identifies vulnerabilities according to an example implementation.

Referring to FIG. 9, in accordance with example implementations, an apparatus 900 includes at least one processor 920 and a memory 910. The memory 910 stores instructions 914 that, when executed by the processor(s) 920, cause the processor(s) 920 to determine an enumeration of components associated with a software product; based on the enumeration, identify vulnerabilities published in a database associated with the components; generate a block of a blockchain representing a state of the database; and generate a stamp to be associated with a release of the software product. The stamp represents an index to the block of the blockchain.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   determining, by a processor of a computer, an inventory of components that are contained in a particular version of a software product;
   identifying, by the processor, vulnerable components of the particular version of the software product that have vulnerability risks, by identifying entries of a software vulnerability database that correspond to any components in the inventory of components;
   generating, by the processor, a block of a database blockchain representing a state of the software vulnerability database at a time when the vulnerable components were identified, wherein each block of the database blockchain represents a different state of the software vulnerability database; and
   generating, by the processor, a validation stamp containing a first reference to an application block that contains the inventory of components of the particular version of the software product and a second reference to the block of the database blockchain that represents the state of the software vulnerability database at the time the vulnerable components were identified.

2. The method of claim 1, wherein the application block is one block of an application blockchain, each block of the application blockchain representing a different version of the software product.

3. The method of claim 1, wherein the second reference comprises a blockchain page number.

4. The method of claim 1, wherein the validation stamp further comprises data representing a hash of the software product.

5. The method of claim 1, wherein the validation stamp further comprises data representing a name of the software product.

6. The method of claim 1, wherein the validation stamp further comprises data representing identifiers for the inventory of components.

7. The method of claim 1, wherein the validation stamp further comprises data representing identifiers for the vulnerable components appearing in the block of the database blockchain.

8. The method of claim 1, wherein the database blockchain comprises a master database blockchain, and the master database blockchain comprises a plurality of component vulnerability entry blocks representing corresponding states of the entries of the software vulnerability database.

9. The method of claim 8, wherein a given component vulnerability entry blockchain represents an entry of the software vulnerability database and changes to the entry.

10. The method of claim 8, wherein the plurality of component vulnerability entry blocks are associated with a plurality of security reporters.

11. The method of claim 8, wherein the master database blockchain is signed by a central authority.

12. The method of claim 11, wherein the central authority comprises a single entity or a plurality of entities.

13. An apparatus comprising:
    at least one processor; and
    a memory to store instructions that, when executed by the at least one processor, cause the at least one processor to:
      determine an inventory of components that are contained in a particular version of a software product;
      identify vulnerable components of the particular version of the software product that have vulnerability risks, by identifying entries of a vulnerability database that correspond to any components in the inventory of components;
      generate a block of a database blockchain representing a state of the vulnerability database at a time when the vulnerable components were identified, wherein each block of the database blockchain represents a different state of the vulnerability database; and
      generate a validation stamp for the particular version of the software product, wherein the validation stamp contains a first reference to the block of the database blockchain that represents the state of the vulnerability database at the time when the vulnerable components were identified and a second reference to an application block that contains the inventory of components of the particular version of the software product.

14. The apparatus of claim 13, wherein the vulnerable components comprise third party components of the software product.

15. The apparatus of claim 13, wherein the database blockchain comprises a master blockchain, and the master blockchain comprises a plurality of component vulnerability entry blockchains representing corresponding states of the entries of the vulnerability database.

16. A non-transitory machine readable storage medium storing instructions that, when executed by a machine, cause the machine to:
    determine an inventory of components that are contained in a particular version of a software product;
    identify vulnerable components of the particular version of the software product that have vulnerability risks, by identifying entries of a software vulnerability database that correspond to any components in the inventory of components;
    generate a block of a database blockchain representing a state of the software vulnerability database at a time when the vulnerable components were identified, wherein each block of the database blockchain represents a different state of the software vulnerability database; and
    generate a validation stamp containing a first reference to an application block that contains the inventory of components of the particular version of the software product and a second reference to the block of the database blockchain that represents the state of the software vulnerability database at the time the vulnerable components were identified.

17. The non-transitory machine readable storage medium of claim 16, wherein the application block is one block of an application blockchain, each block of the application blockchain representing a different version of the software product.

18. The non-transitory machine readable storage medium of claim 16, wherein the second reference comprises a page number of the block of the database blockchain.

19. The non-transitory machine readable storage medium of claim 16, wherein the database blockchain comprises a master blockchain, and the master blockchain comprises a plurality of component vulnerability entry blockchains representing corresponding states of the entries of the software vulnerability database.

20. The non-transitory machine readable storage medium of claim 19, wherein a given component vulnerability entry blockchain comprises a plurality of component vulnerability entry blocks representing an entry of the software vulnerability database and changes to the entry.

* * * * *